United States Patent
Ding et al.

(10) Patent No.: US 6,403,721 B1
(45) Date of Patent: Jun. 11, 2002

(54) ENGINEERED POLYOLEFIN MATERIALS WITH ENHANCED SURFACE DURABILITY

(75) Inventors: Ruidong Ding, Arlington; Satchit Srinivasan, Carrollton; Edmund K. Lau, Arlington, all of TX (US)

(73) Assignee: Solvay Engineered Polymers, Grand Prairie, TX (US)

( * ) Notice: Subject to any disclaimer, the term of this patent is extended or adjusted under 35 U.S.C. 154(b) by 0 days.

(21) Appl. No.: 09/672,063

(22) Filed: Sep. 29, 2000

(51) Int. Cl.$^7$ .......................... C08L 9/00; C08L 23/00; C08L 33/02; C08L 43/00; C08L 45/00
(52) U.S. Cl. .................. 525/191; 525/201; 525/216; 525/232; 525/240; 525/241
(58) Field of Search ................ 525/191, 201, 525/216, 232, 240, 241

(56) References Cited

U.S. PATENT DOCUMENTS

| | | |
|---|---|---|
| 3,236,917 A | 2/1966 | Natta et al. |
| 3,264,272 A | 8/1966 | Rees |
| 4,000,216 A | 12/1976 | Lang |
| 4,393,009 A | 7/1983 | Freitag et al. |
| 4,480,065 A | 10/1984 | Kawai et al. ............... 524/418 |
| 4,888,391 A | 12/1989 | Domine et al. ............. 525/221 |
| 4,945,005 A | 7/1990 | Aleckner et al. ........... 428/500 |
| 4,946,896 A | 8/1990 | Mitsumo et al. ............. 525/93 |
| 4,950,541 A | 8/1990 | Tabor et al. ................ 428/373 |
| 5,194,509 A | 3/1993 | Hasenbein et al. .......... 525/285 |
| 5,548,029 A | 8/1996 | Powers et al. .............. 525/195 |
| 5,883,188 A | 3/1999 | Hwang et al. ................ 525/71 |
| 5,971,869 A | 10/1999 | Rajagopalan et al ........ 473/371 |
| 6,207,761 B1 * | 3/2001 | Smith et al. ................ 525/221 |

FOREIGN PATENT DOCUMENTS

| | | |
|---|---|---|
| EP | 0 794 225 A1 | 10/1997 |
| JP | 10219040 | 10/1998 |
| WO | WO 93/25617 | 12/1993 |
| WO | WO 97/38050 | 10/1997 |

* cited by examiner

Primary Examiner—Nathan M. Nutter
(74) Attorney, Agent, or Firm—Winston & Strawn

(57) ABSTRACT

A polyolefin blend is presented that includes a base component of a propylene-containing-polymer, such as polypropylene, a propylene-based polyolefin-metal salt, and an ethylene-based polyolefin-metal salt. Optionally, the blend includes a copolymer of ethylene and an alpha-olefin; a terpolymer of ethylene, alpha-olefin, and a diene; a thermoplastic elastomer, such as an olefinic copolymer with styrene; and/or a copolymer of ethylene, at least one alpha-olefin, and a monomer with a hydrophilic moiety. Methods of preparing such blends, as well as resultant articles including such blends, are also part of the invention.

25 Claims, No Drawings

US 6,403,721 B1

ENGINEERED POLYOLEFIN MATERIALS WITH ENHANCED SURFACE DURABILITY

FIELD OF THE INVENTION

The invention relates to polyolefin blends having superior physical properties including enhanced scratch resistance, rigidity, and toughness. The invention also relates to the process of manufacturing such polyolefin blends and to articles produced from such polyolefin blends.

BACKGROUND ART

In numerous applications, such as many in the automotive industry, a polymeric material that exhibits a good level of scratch resistance balanced with rigidity and impact toughness is desired. These properties tend to vary, however, such that efforts to enhance one will often result in deterioration of one, or both, of the others.

Polypropylene blends are useful in a wide variety of applications due to their strength, environmental resistance and processability. While highly crystalline polypropylene does exhibit good mar and scratch resistance, it does not possess the impact toughness required in many important applications such as the making of automobile parts. Special polymeric materials have been developed that overcome this problem to some degree.

Attempts to remedy polypropylene's deficiency in impact toughness by blending with impact modifying copolymers of ethylene and other alpha-olefins, terpolymers of ethylene, other alpha-olefins, and dienes have not been completely successful. Elastomer modified polypropylene blends, also known as thermoplastic polyolefins, have the advantage of improved toughness, especially for cold temperature impact. They are widely used for formed or shaped articles such as automotive parts, toys, furniture, and housing products. Although the impact toughness of those compositions is improved by these modifiers, the scratch resistance has been found to decrease. That is, the scratch resistance of polypropylene blends containing impact modifiers such as ethylene-propylene copolymers, ethylene-propylene terpolymers, ethylene-butene copolymers, or ethylene-octene copolymers is poor.

Increasing the crystallinity of the polypropylene to obtain a harder surface, and/or adding hard mineral filler to these blends, has been attempted as a countermeasure without complete success. One conventional method to enhance surface characteristics is to use inorganic particulate material. Uniform dispersion of these particulates is difficult to achieve, however, and this results in non-uniform surface properties in such products. The use of these particulates also tends to damage other desirable physical properties of the polyolefin, resulting in loss of impact strength and/or toughness. Debonding of these particulates from the polyolefin system, also contributes to stress whitening, which is not desirable.

Another conventional way to enhance surface characteristics of various articles is to apply acrylic polymers or coatings to an article and subsequently cure the polymer or coating with a radiation source, such as ultraviolet radiation.

A method to enhance surface characteristics of polyolefins is described in U.S. Pat. No. 4,000,216, which discloses an extrudable, moldable, or heat formable blend of a thermoplastic polymer and a surface altering agent of at least one monoethylenically unsaturated monomer for said thermoplastic polymer, wherein the surface altering agent has cross-linked polymer particles having an average size of 1 to 30 microns. The surface altering agent is preferably prepared by an endopolymerization, which is used with a compatible polyolefin to be altered.

European Patent Application 0794225A1 describes thermoplastic resin compositions comprising polypropylene, a styrene containing elastomer, and talc, and having an acceptable balance of toughness and rigidity. The disclosure stresses the importance of the proportions of each component used to achieve this balance. In PCT Application WO97/38050, a similar balance of properties is reported for a thermoplastic resin comprising an ethylene-propylene based polymer composition, an ethylene/alpha-olefin copolymer based rubber and/or a rubber containing vinyl aromatic compounds and talc. Another example of a composition that provides an acceptable balance of toughness and rigidity is reported in Japanese Patent Application 10219040A for a resin composition consisting of a polyolefin based resin and a block copolymer based on aromatic vinyl and butadiene monomer units. Polymer blends which can be formed or shaped into lightweight and durable articles useful, for example, as automobile parts, toys, housings for various types of equipment, and the like, are well known in the art.

The physical and/or chemical properties of the thermoplastic polyolefin blends can be modified either by blending them with other thermoplastic polymers, or by incorporating into them materials having one or more polar groups, or both. For example, U.S. Pat. No. 4,946,896 describes a thermoplastic polyolefin comprising 20–80 weight percent polypropylene; 5–38 weight percent of an ethylene copolymer consisting of ethylene, an ester unit of either alkyl acrylate or methacrylate, and an unsaturated dicarboxylic acid anhydride; and 5–70 weight percent ethylene-propylene rubber. Similarly, U.S. Pat. No. 4,888,391 describes a polyolefin composition comprising a blend of a polyolefin as the continuous phase with an ethylene/acrylate/acrylic acid terpolymer as a discontinuous phase. These polyolefin-based blends are paintable.

Despite these prior art formulations, there remains a need to obtain polymeric materials which have a good level of mar/scratch resistance along with the physical property requirements of rigidity, strength, processability, and low temperature impact toughness. The present invention provides certain blends that meet these needs.

SUMMARY OF THE INVENTION

The present invention relates to polyolefin blends that have excellent scratch and mar resistance, rigidity, and toughness.

In one embodiment the blends contain: a first component of a first propylene containing polymer; a second component of a propylene-based polyolefin-metal salt that is a reaction product of a second propylene-containing polymer and a first organic monomer containing a hydrophilic moiety that is at least partially neutralized with a metal ion, and/or a copolymer of propylene and a first organic monomer containing a hydrophilic moiety that is at least partially neutralized with a metal ion; and a third component of an ethylene-based polyolefin-metal salt that is a reaction product of an ethylene-containing polymer and a second organic monomer and contains a hydrophilic moiety that is at least partially neutralized with a metal ion, and/or an ionomer that is at least partially neutralized with a metal ion.

The polyolefin blend may contain about 50 percent to about 75 percent of propylene polymers; about 1 percent to about 30 percent of propylene-based polyolefin-metal salts;

and about 5 percent to about 49 percent of ethylene-based polyolefin-metal salts. Preferably, the polyolefin blend contains about 53 percent to about 70 percent of the propylene polymers; about 4 percent to about 20 percent of the propylene-based polyolefin-metal salts; and about 15 percent to about 35 percent of the ethylene-based polyolefin-metal salts. Even more preferably, the polyolefin blend contains about 57 percent to about 68 percent of propylene polymers; about 5 percent to about 15 percent of the propylene-based polyolefin-metal salts, and about 20 percent to about 30 percent of the ethylene-based polyolefin-metal salts.

The polyolefin-metal salts may include a polyolefin backbone functionalized with at least about 0.3 percent, preferably at least 0.5 percent, of hydrophilic organic compounds based on the combined weight of the polyolefin and the hydrophilic organic compounds. In some embodiments the polyolefin-metal salts may include a random copolymer of ethylene with an ethylenically unsaturated carboxylic acid, which is subsequently neutralized with a metal salt. Such a compound is commonly called an ionomer. In a preferred embodiment, the polyolefin-metal salts are comprised of an inert polyolefin, for example polypropylene, polyethylene, or an ethylene-alpha-olefin copolymer, which is subsequently reacted with a reagent via a post-polymerization free radical process. For example, any of these polyolefins may be functionalized with maleic anhydride, and the reaction product neutralized with a metal ion. Alternatively, the polyolefins may be functionalized with an organo-metal salt in a single step process. In a preferred embodiment of the invention, the propylene polymers are semi-crystalline, and the propylene-based polyolefin-metal salts are semi-crystalline homopolymers of polypropylene functionalized with an organic monomer containing a hydrophilic moiety, and neutralized with a metal.

The invention also relates to the method of manufacturing a polyolefin blend of such compositions. The method includes providing about 50 to about 75 parts of propylene-containing polymer; providing about 5 to about 49 parts of ethylene-based polyolefin-metal salts; providing about 1 to about 30 parts of propylene-based polyolefin-metal salts, and blending the provided components to make a homogenous blend.

The method of providing propylene-based polyolefin-metal salts may include the steps of contacting a propylene-containing polymer and an organic monomer containing a hydrophilic moiety under conditions such that propylene polymers are functionalized with the hydrophilic moiety, and neutralizing the reaction product with metal ions. Similarly, the method of providing ethylene-based polyolefin-metal salts may include the steps of contacting a ethylene-containing polymer and an organic monomer containing a hydrophilic moiety under conditions such that ethylene polymers are functionalized with the hydrophilic moiety, and neutralizing the reaction product with metal ions. The reactive blending may be done in an extruder. The step of neutralizing the reaction product with metal ions may optionally be done approximately simultaneously with the step of blending the components in a twin screw extruder. The process of contacting a propylene-containing polymer and contacting a ethylene-containing polymer with an organic monomer containing a hydrophilic moiety under conditions such that propylene and ethylene polymers are functionalized with the hydrophilic moiety may be performed in a single reaction mass.

DETAILED DESCRIPTION OF THE INVENTION

As used herein, unless otherwise stated the term "percent" refers to weight percent of a polymer in the polymeric portion, that is, not including inorganic fillers and the like, of a composition or blend.

As used herein, the term "polymer" includes homopolymers, copolymers, terpolymers, and the like. As used herein, the term "propylene polymer" is meant to include polymers wherein propylene is the monomer present in a concentration of at least about 50 percent.

As used herein, the term "functionalized polyolefin," for example "functionalized polypropylene," includes both ionomers, copolymers of olefins and hydrophilic moiety-containing monomers, and polyolefin-metal salts.

As used herein, the term "ionomer" is meant to include a metal salt of a copolymer of ethylene and ethylenically unsaturated carboxylic acids.

As used herein, the term "polyolefin-metal salt" with a specific monomer preceding it, for example a "propylene-based polyolefin-metal salt," is a reaction product of a propylene-containing polymer and an organic monomer containing a hydrophilic moiety, wherein said reaction product is at least partially neutralized with a metal ion. Typically, a propylene-based polyolefin-metal salt is a polymer wherein the polyolefin monomer, i.e., propylene, is present in a polyolefin at a concentration of at least about 80 percent, preferably at least 95 percent, before functionalizing the polyolefin, and where the polyolefin has then been functionalized with one or more hydrophilic moieties such as carboxylic acid-containing or other hydrophilic moiety-containing unsaturated monomers, i.e., maleic anhydride. This reaction product is advantageously at least partially neutralized with a metal ion.

In one embodiment the polyolefin blends contain polyolefin homopolymers and/or copolymers, propylene-based polyolefin-metal salts, and ethylene-based polyolefin-metal salts. Preferably the polyolefin homopolymers and/or copolymers are polypropylene.

In a second embodiment the polyolefin blends contain polypropylene homopolymers and/or copolymers, propylene-based polyolefin-metal salts, and ethylene-based polyolefin-metal salts.

In another embodiment the polyolefin blends contain polypropylene homopolymers and/or copolymers, propylene-based polyolefin-metal salts and/or copolymers of propylene and carboxylic acid monomers, and ethylene-based polyolefin-metal salts and/or ethylene ionomers.

In yet another embodiment of the invention the polyolefin blends contain a propylene-containing polymer; a reaction product of an unsaturated propylene-containing polymer functionalized with a hydrophilic moiety, in particular carboxylic acids, and neutralized with a metal; and a reaction product of an unsaturated ethylene-containing polymer functionalized with a hydrophilic moiety, in particular carboxylic acids, and neutralized with a metal.

In each of the above embodiments there is advantageously included one or more copolymers of styrene and one or more olefins; a reaction product of unsaturated copolymers of ethylene and at least one alpha-olefin that has been functionalized with a hydrophilic moiety, and neutralized with a metal salt; copolymers of ethylene and an alphta-olefin; terpolymers of ethylene, an alpha-olefin, and a diene; and a thermoplastic elastomer, such as a styrenic block copolymer.

In one preferred embodiment the polyolefin blends can include polyolefin homopolymers and copolymers, ethylene-based ionomers and/or ethylene-based polyolefin-metal salts, propylene-based polyolefin-metal salts, and The polyolefin blends of the present invention have excellent scratch resistance, high rigidity, and toughness. These blends may also be advantageously paintable.

The following discussion concerns primarily propylene and ethylene based polymers, but one of ordinary skill in the art will readily see the applicability to analogous polyolefin systems.

The component usually in the largest proportion in the present blends is the first component. This component includes a propylene-containing polymer, preferably is a homopolymer of propylene. This component may also include a copolymer of propylene and at least one other olefin, for example, ethylene; 1-butene, 1-pentene; 1-hexene, 2-methyl-1-propene, 3-methyl-1-pentene, 4-methyl-1-pentene, 3,3-dimethyl-1-butene, 2,4,4-trimethyl-1-pentene, 5-methyl-1-hexene, and/or 1-4-ethyl-1-hexene; or mixtures thereof.

It is preferred that the base component polymers be semi-crystalline.

The polyolefin blend contains this first component, that is, a homopolymer and/or a copolymer of propylene, in an amount of about 50 to about 75 weight percent, preferably about 53 to about 70 weight percent, and more preferably about 57 to about 68 weight percent.

The next two components in the polyolefin blend are functionalized polyolefins. Both ethylene-based and propylene-based functionalized polyolefins are advantageously incorporated into the blend. These functionalized polyolefins may include ethylene-based polyolefin-metal salts, propylene-based polyolefin-metal salts, and/or ethylene ionomers and copolymers of propylene and carboxylic acid monomers.

It is believed that polypropylene has excellent resistance to scratches and mars due in part to its high crystallinity. Pure polypropylene, however, has low impact resistance. Conventionally, the addition of ethylene copolymer improves impact strength, but markedly worsens scratch and mar resistance. Thermally reversible ionic cross-linking of ethylene-based polyolefin-metal salts and/or of ionomers of ethylene permits excellent entropic recovery after deformation, which provides enhanced mar and scratch resistance over blends containing ethylene polymers. Ionomers of ethylene, and ethylene-based polyolefin-metal salts, have good impact properties at low temperatures by themselves. A blend of polypropylene and ionomers of ethylene or ethylene-based polyolefin-metal salts, however, tends to have poor impact strength due to the incompatibility between the two components.

It is believed that the compatibility of polyolefins, especially polypropylene, with ionomers of ethylene and/or ethylene-based polyolefin-metal salts, is greatly enhanced by the presence of propylene-based polyolefin-metal salts. The physical properties of the heterogenous polymer blends are governed by the interfacial interactions between different phases. It is believed that this propylene-based polyolefin-metal salt enhances dispersion of the composition, and increases interfacial interactions leading to surprisingly superior reinforcement without negatively affecting toughness. These interactions significantly influence blend morphology, dispersion, and distribution of polymer phases. The inclusion of propylene-based polyolefin-metal salts in a polypropylene and ethylene-based polyolefin-metal salts blend significantly improves the interfacial strength of the polymer phases, due probably to ionic bonding, and yields a thermoplastic resin with an excellent balance of scratch resistance, stiffness, and impact resistance.

In one embodiment the functionalized polyolefins are exclusively ethylene-based polyolefin-metal salts and propylene-based polyolefin-metal salts.

It is preferred that the propylene-based polyolefin-metal salts and ethylene-based polyolefin-metal salts be formed from semi-crystalline homopolymers of propylene and ethylene, respectively. The resulting propylene-based polyolefin-metal salts component and/or ethylene-based polyolefin-metal salts may be semi-crystalline as defined above.

The polyolefin blend contains about 5 percent to about 50 percent of ethylene-based polyolefin-metal salts, preferably from about 15 percent to about 35 percent of ethylene-based polyolefin-metal salts. Excellent test results, as described herein, were observed when the polyolefin blend contain about 20 percent to about 30 percent of ethylene-based polyolefin-metal salts. The same concentrations apply to embodiments incorporating ethylene ionomers which either partially or completely are substituted for ethylene-based polyolefin-metal salts.

The polyolefin blend contains about 1 percent to about 30 percent of propylene-based polyolefin-metal salts, preferably about 4 percent to about 20 percent of proplylene-based polyolefin-metal salts. Excellent test results were achieved with polyolefin blends containing about 5 percent and about 15 percent of propylene-based polyolefin-metal salts. The same concentrations apply to embodiments incorporating copolymers of propylene and carboxylic acid monomers which either partially or completely are substituted for propylene-based polyolefin-metal salts.

The propylene-based polyolefin-metal salts of this invention have a backbone of a homopolymer or one or more copolymers of propylene and up to about 20 mole percent ethylene or other alpha-olefin having up to about 12 carbon atoms. If a copolymer, this polyolefin backbone can be random, block or graft. At least a fraction of this polyolefin backbone is grafted with an unsaturated organic compound containing at least one site of unsaturation and at least one carbonyl or carboxyl or other hydrophilic group.

These functional moieties would be added to the polyolefin backbone in an amount of at least about 0.01 percent, preferably at least about 0.1 percent, and more preferably at least about 0.5 percent, based on the combined weight of the polymer and the hydrophilic organic compound. The maximum amount of unsaturated organic compound content can vary as desired, but typically it should not exceed about 25 percent, often it should not exceed about 10 percent, and in most cases it should not exceed about 5 percent. Typical polyolefin-metal salts includes P/Y copolymers, where: P is the olefinic backbone, such as propylene and/or ethylene; and Y is the functional comonomer, such as acrylic or methacrylic acid, present in an amount of about 0.01 percent to about 20 percent, preferably about 0.5 percent to about 5 percent, of the polymer.

An unsaturated hydrophilic organic compound can be grafted to the base polymer by any technique known to one skilled in the art, such as those taught in U.S. Pat. No. 3,236,917 and U.S. Pat. No. 5,194,509, both of which are incorporated herein by reference. For example, in the '917 patent, the base polymer is introduced into a two-roll mixer and mixed at a temperature of 60° C. The unsaturated organic compound is then added along with a free radical initiator, such as, for example, benzoyl peroxide, and the components are mixed at 30° C. until the grafting is completed. In the '509 patent, the procedure is similar except that the reaction temperature is higher, e.g. 210° to 300° C. and a free radical initiator is not used.

An alternative method of grafting is taught in U.S. Pat. No. 4,950,541, the disclosure of which is also incorporated herein by reference, by using a twin-screw devolatilizing extruder as the mixing apparatus. The base polymer and unsaturated organic compound are mixed and reacted within the extruder at temperatures at which the reactants are molten and in the presence of a free radical initiator. Preferably, the unsaturated organic compound is injected into a zone maintained under pressure within the extruder.

A method of preparing functionalized polyolefin-metal salts is to form a reaction product by first functionalizing polyolefins with one or more hydrophilic monomers, for example maleic anhydride or acrylic acid.

Any unsaturated carboxylic acid monomer that can be neutralized can be used in the manufacture of functionalized polyolefins of this invention. Representative unsaturated organic compounds that contain at least one carbonyl group include the ethylenically unsaturated carboxylic acids, anhydrides, esters, and their salts, both metallic and nonmetallic. Preferably, the organic compound contains ethylenic unsaturation conjugated with the carbonyl group. Representative compounds include maleic, fumaric, acrylic, methacrylic, itaconic, crotonic, alpha-methyl crotonic, cinnamic, and the like, acids and their anhydride, ester and salt derivatives, if any.

Combinations of functionalizing compounds can be used, such as methacrylate-vinyl acetate mixtures or acrylic acid/methacrylic acid mixtures.

Preferably, maleic anhydride, acrylic acid, methacrylic acid, or combinations thereof are used.

The reaction product is then advantageously neutralized with a metal, typically an alkali or alkaline-earth containing compound, typically a salt or a base, to form the functionalized polyolefin-metal salts. Preferably, the acid moiety (or moieties) on each of the ionomers and functionalized polyolefin-metal salts in a blend of this invention is (are) neutralized about 30 to about 100 percent, preferably at least about 40 percent, more preferably at least about 60 percent. The acid moiety is preferably neutralized with an alkali or an alkaline earth metal, but other cations can be used. Examples of suitable cations include lithium, sodium, potassium, magnesium, calcium, barium, lead, tin, zinc, aluminum, or a combination of such cations. The preferred cations are zinc, lithium, sodium, calcium, and magnesium. These cations are preferably added as bases to increase the degree of neutralization of acid moieties.

Such reaction may be carried out in situ during extrusion of the blend in a twin-screw extruder. Such reactions may also be performed in a one-step process using functional oligomeric salts.

The functionalized polyolefin-metal salts can then be blended with polypropylene to produce the improved polyolefin blends of the present invention.

Alternatively, functionalized polyolefin-metal salts can be formed continuously and simultaneously with the blending of the components of the invention, for example using a twin screw extruder.

In an embodiment the polyolefin blend contains copolymers of propylene and carboxylic acid monomers substituted for some or all of the propylene-based polyolefin-metal salts. In another embodiment the polyolefin blend contains ethylene ionomers substituted for some or all of the ethylene-based polyolefin-metal salts. In yet another embodiment the polyolefin blend contains the first base component, e.g., polypropylene and the second and third components that are polyolefin-metal salts of both ethylene and propylene.

The polyolefinic ionomer includes P/X/Y copolymers. where: P is the olefinic comonomer, such as propylene and/or ethylene; X is a softening comonomer, such as acrylate or methacrylate present in an amount of 0 to about 10 percent, preferably about 0 to about 2 percent of the polymer; and Y is the functional comonomer, such as acrylic or methacrylic acid, present in an amount of about 0.01 percent to about 20 percent, preferably about 0.5 percent to about 5 percent, of the polymer.

Ionomer resins, for example those sold under the trademark SURLYN™ by E.I. DuPont de Nemours and Co. of Wilmington, Del., are suitable for use in the blends. These ionomer resins are a copolymer of an olefin and an alpha, beta ethylenically unsaturated carboxylic acid with 10 to 90 percent of the carboxylic acid groups neutralized by a metal ion. See, e.g., U.S. Pat. No. 3,264,272. Commercially available ionomer resins typically include copolymers of ethylene and methacrylic or acrylic acid. These ionomer resins are generally distinguished by the type of metal ion, the amount of acid, and the degree of neutralization.

Suitable ethylene ionomers include, but are not limited to, ethylene/acrylic acid, ethylene/methacrylic acid, ethylene/acrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, ethylene/acrylic acid/n-butyl methacrylate ionomers, and combinations thereof.

The manner in which the ionomers are made is known in the art. The ionomer can be made by adding organic monomer containing a hydrophilic moiety, also called an ionic monomer, to the composition during the manufacture of the blends of the polyolefinic polymer.

Acrylic acid, methacrylic acid, maleic anhydride, itaconic acid, and the like may under some circumstances be added to the ethylene and/or propylene monomers during the polymerization of the polyethylene and/or copolymers of propylene and carboxylic acid monomers, respectively.

The method of manufacturing a polyolefin blend includes providing propylene-containing polymer; providing ionomers and/or ethylene-based polyolefin-metal salts; providing any optional polymeric components, and blending the components to make a homogenous blend.

One method of manufacturing propylene-based polyolefin-metal salts includes the steps of contacting a propylene-containing polymer and an organic monomer containing a hydrophilic moiety under conditions such that the propylene polymers are functionalized with the hydrophilic moiety, and neutralizing the reaction product with metal ions.

One method of manufacturing ethylene-based polyolefin-metal salts includes the steps of contacting a ethylene-containing polymer and an organic monomer containing a hydrophilic moiety under conditions such that the ethylene polymers are functionalized with the hydrophilic moiety, and neutralizing the reaction product with metal ions. The step of neutralizing the functionalized olefins with metal ions can be accomplished approximately at the same time as the blending with the polyolefins. It is preferred, however, to add already functionalized propylene-containing polymer as a separate component.

The manufacture of propylene-based polyolefin-metal salts and ethylene-based polyolefin-metal salt can be performed in a single reaction mass. It is conceivable that such reactions may also be performed in a one-step process using functional oligomeric salts.

An optional component present in an embodiment of the polyolefin blend is a copolymer or functionalized polyolefins of ethylene, high alpha-olefin copolymers, and monomers with a hydrophilic moiety. High alpha-olefins include, for example, an alpha-olefin of 4 to about 20 carbon atoms (e.g. 1-butene, 1-hexene, 4-methyl-1-pentene, 1-heptene, 1-octene, styrene, etc.), preferably of 4 to about 10 carbon atoms, and most typically these polymers include ethylene and one or more of 1-butene, 1-hexene, or 1-octene Again, the hydrophilic component can be added in types and in concentration ranges like those described for other ionomers.

The concentration of these ionomers or functionalized polyolefins of ethylene and high alpha-olefin copolymers, when included, can be from about 1 percent to about 20 percent, preferably from about 5 percent to about 15 percent, of the polyolefin blend. These ionomers, when used, are added to the blend of the components discussed above.

Another optional component present in a preferred embodiment of the polyolefin blend of the present invention is an interfacial modifier. This is preferably a thermoplastic elastomer including a styrenic block copolymer. The term "styrene block copolymer" or "styrenic block copolymer" means an elastomer having at least one block segment of a styrene repeating unit in combination with saturated or unsaturated rubber monomer segments. This component, when included, contributes to the compatibilization of the components in the blend, and also significantly improves adhesion between the polymeric phases. This typically increases the toughness of the overall blend while maintaining rigidity. This component is therefore an optional toughener.

Acceptable styrenic block copolymers include, but are not limited to, copolymers of styrene, ethylene and another alkene. Exemplary copolymers include styrene-(ethylene-butene)styrene, styrene-(ethylene-propylene)-styrene, styrene-(ethylene-butene), styrene-(ethylene-propylene), styrene-butene-styrene, styrene-butene, styrene-butadiene, styrene-isoprene, and hydrogenated variations thereof. Suitable styrene block copolymers also include styrene-butadiene-styrene, styrene-isoprene-styrene, alpha-methylstyrene-butadiene-alpha-methylstyrene, alpha-methylstyrene-isoprene-alpha-methylstyrene, and the like. The structure of the styrene block copolymers useful in the present invention can be of the linear or radial type, and of the bi-block or tri-block type. In some embodiments the styrenic block copolymers having at least four different blocks or a pair of two repeating blocks, for example, repeating styrene/butadiene or styrene/ethylene propylene blocks, are desirable.

Styrene block copolymers are available from Shell Chemical of Houston, Tex. under the trademark KRATON, and from Phillips Petroleum Co., Inc. of Bartlesville, Okla. under the trademark K-RESIN.

The rubber portion of the styrene block copolymer may be either unsaturated or saturated. Block copolymers with unsaturated rubber monomer units may comprise homopolymers of butadiene or isoprene and copolymers of one or both of these two dienes with a minor amount of styrenic monomer. When such a block is hydrogenated, the resulting product is, or resembles, a regular copolymer block of ethylene and 1-butene. If the conjugated diene employed is isoprene, the resulting hydrogenated product is or resembles a regular copolymer block of ethylene and propylene. Hydrogenation of block copolymers with unsaturated rubber monomer units may be effected by use of a catalyst.

The styrenic block copolymer component, when used, can make up from about 0.1 to about 40 percent, more preferably from about 1 to about 20 percent, and even more preferably about 5 to about 15 percent of the overall polyolefin blend. Of course, quantities less than 0.1 percent can be used but will have little effect on the properties of the blend.

A random styrenic copolymer of ethylene and styrene may be used in place of or in addition to the styrenic block copolymer. It is preferred that the random styrenic copolymer of ethylene and styrene have a blocky comonomer distribution. By blocky comonomer distribution it is meant that there are more repeating monomer units than would be expected in a random distribution. Such a distribution would be provided by a random distribution of blocks of a plurality of monomer units. This type of polymer can be manufactured by single-site catalysis, i.e., metallocene or single-site non-metallocene catalysis. The random styrenic copolymer containing ethylene and styrene is present in an amount from about 0.1 to about 40 percent, more preferably from about 1 to about 20 percent, and even more preferably about 5 to about 15 percent of the overall polyolefin blend.

Another optional component present in a preferred embodiment of the polyolefin blend of the present invention is a toughening component of semi-crystalline or random copolymers of ethylene and an alpha-olefin, and/or random terpolymers that include ethylene and an alpha-olefin plus at least one diene.

The random noncrystalline copolymer of ethylene and alpha-mono-olefins, such as propylene, are rubbery toughening agents. The toughening component useful in the practice of the invention will typically include from about 30 to about 90 weight percent, preferably from about 40 to about 80 weight percent, and more preferably from about 50 to about 70 weight percent of a first olefin monomer (preferably ethylene) and from about 10 to about 70 weight percent, preferably from about 20 to about 60 weight percent, and more preferably from about 30 to about 50 weight percent of a second alpha-olefin (preferably 1-hexene or 1-octene).

The random terpolymer refers to a noncrystalline rubbery copolymer of two or more olefins, such as ethylene and propylene, and a lesser quantity of a nonconjugated diene. Suitable nonconjugated dienes include straight chain dienes such as 1,4-hexadiene; cyclic dienes such as cyclooctadiene or dicyclopentadiene; and bridged cyclic dienes such as ethylidene norbornene. When dienes are used, any $C_4$ to $C_{18}$ alkene can be used. A preferred diene for use in such terpolymers is ethylidene norbornene.

The terpolymer toughening component useful in the practice of the invention will typically include from about 30 to about 90 weight percent, preferably from about 40 to about 80 weight percent, and more preferably from about 50 to about 70 weight percent of a first olefin monomer (i.e., ethylene); typically from about 10 to about 70 weight percent, preferably from about 20 to about 60 weight percent, and more preferably from about 30 to about 50 weight percent of a second alpha-olefin, and typically from about 0.5 to about 20 weight percent, preferably from about 1 to about 12 weight percent, and more preferably from about 3 to about 8 weight percent of a non-conjugated diene. When a terpolymer is used, the amount of diene in the terpolymer is not critical and values as low as about 0.5 percent of diene are useful.

Compounds suitable as toughening components are commercially available from Exxon Chemical Americas of Houston, Tex. as VISTALON 404, 2727, 808 or 878, from Uniroyal Chemical, Division of Crompton Corporation of Middlebury, Conn. as ROYALENE 521, 552 or 580, and from Dupont Dow Elastomers LLC of Wilmington, Del. as NORDEL 4640, 2744 or 3730P. The toughening component includes (A) a copolymer of ethylene and another alpha-olefin or (B) a terpolymer of ethylene, another alpha-olefin and a diene. This toughening component adds toughening properties to the composition and improves the impact resistance of the blends.

Suitable alpha-olefins present in this optional toughening component can include any $C_3$ to $C_{18}$ olefin, preferably a $C_3$ to $C_{10}$ olefin. For example, propylene, butene or octene are useful. In some embodiments, a copolymer or terpolymer containing ethylene and octene are preferred.

The terpolymers used in the optional toughening component of the present invention can be made according to any of the various means known to the ordinary-skilled artisan in this field, such as by addition free radical polymerization, cationic or anionic polymerization, or catalyst driven polymerization, to name but a few. As the ordinary-skilled artisan in this field knows, each of these different methods can be used to produce different types of terpolymers such as graft polymers, block polymers, random polymers, etc., as desired.

This toughening component makes up from about 0 to about 40 percent of the overall composition, preferably from about 1 to about 25 percent, and even more preferably from about 8 to about 20 percent.

The polyolefin blends preferably contain: a semi-crystalline propylene-containing polymer, propylene and alpha-olefin copolymer, i.e., an ethylene-propylene copolymer, or a combination thereof; a reaction product of a propylene-containing polymer functionalized with a hydrophilic moiety, in particular carboxylic acids, and neutralized with a metal ion; an ethylene-based ionomer and/or a reaction product of an ethylene-containing polymer functionalized with a hydrophilic moiety, in particular carboxylic acids, and neutralized with a metal ion; optionally, an ionomer of ethylene and high alpha-olefin monomers or a functionalized polyolefin that is a reaction product of ethylene/high alpha-olefin polymers functionalized with a hydrophilic moiety, in particular carboxylic acids, and neutralized with a metal; optionally, a toughening component including semi-crystalline copolymers of ethylene and alpha-olefin, and/or terpolymers of ethylene, an alpha-olefin, and a diene; and optionally, an interfacial modifier or toughener, for example a thermoplastic elastomer, such as a styrenic block copolymer.

The polyolefin blends can contain other property-modifying ingredients to the extent that the presence of such additives does not interfere with the performance of the compositions, e.g., the scratch and mar resistance and, in some cases, the paintability. For instance, examples of optional modifying ingredients include processing aids, such as calcium stearate; primary antioxidants, such as IRGANOX 1010 or 1076 phenolic antioxidants (available from Ciba Specialty Chemicals of Tarrytown, N.Y.), secondary antioxidants such as IRGANOX 168 phosphite (available from Ciba) or SANDOSTAB PEPQ phosphonite (available from Clariant Corporation of Charlotte, N.C.) or Ultranox phosphite (available from General Electric Specialty Chemicals of Parkersburg, W.Va); ultraviolet light stabilizers, such as carbon black; hindered amine light stabilizers such as Tinuvin and Chimassorb brands (available from Ciba Specialty Chemicals of Tarrytown, N.Y.); and ultraviolet light absorbers such as benzotriazole-based Tinuvin brands (available from Ciba Specialty Chemicals of Tarrytown, N.Y.); and benzophenone-based Cyasorb brands (available from Cytec Industries of Stamford, Conn.).

Another class of modifying ingredients are color concentrates, which may optionally be included at concentrations ranging from about 0 to about 10 percent, typically from about 1 to about 5 percent.

Another example of a class of modifying ingredients are mineral fillers. The mineral fillers can be a treated or untreated inorganic material, such as talc, calcium carbonate, wollastonite, alumina trihydrate, barium sulfate, calcium sulfate, carbon blacks, metal fibers, boron fibers, ceramic fibers, polymeric fibers, kaolin, glass, ceramic, carbon or polymeric microspheres, silica, mica, glass fiber, carbon fiber and/or clay. The mineral filler can optionally be present in an amount from about 0 to about 40 percent of the overall composition, typically from about 5 to about 25 percent.

Each optional ingredient can be admixed with the blend, or admixed with the ingredients during manufacture of the blend. The present invention includes a method of manufacture of the above blends by, for example, extrusion. The polyolefin blends of this invention are mixed by any conventional manner that insures the creation of a relatively homogeneous blend.

Another aspect of the present invention is a method for making an article of manufacture comprising the step of molding the described polyolefin blend into a desired configuration and shape of the article of manufacture.

The present invention also includes the resultant molded blends and the finished articles made therefrom. Given the good balance of toughness and rigidity in the materials of the present invention, as well as other excellent properties noted previously, the polyolefin blends of the invention are suitable for many specialized applications. For example, this material can be shaped into components used in many interior and exterior automobile parts. Shaping, as used herein, could include molding and/or extruding, with the injection molding of a blend of the recited components being preferred. Such finished articles have excellent scratch and mar resistance.

The molded articles from the compositions of these inventions exhibit high resistance to scratches and marring. In addition, such finished articles are optionally paintable. These are important properties in certain commercial applications, though it should be understood that any given blend according to the invention need not have the improved properties in all of these categories.

The fabricated articles of this invention can be prepared by any known thermoplastic fabrication methods, and particularly by known thermoplastic molding methods, such as injection, compression, blow, rotational, reaction injection and molding techniques. Also, the fabricated articles of this invention can be painted by known coating methods, including spray paint applications and in-mold coating techniques.

EXAMPLES

These and other aspects of the present invention may be more fully understood with reference to the following examples, which are merely illustrative of preferred embodiments of the present invention and are not to be construed as limiting the invention.

Examples of prior art blends are included in Examples 1 to 4, shown in Table 1. Representative compositions of blends of the current invention, and physical properties thereof, are found in Examples 5 to 10 also shown in Table 1. This data shows that polyolefin blends with a wide range of physical properties can be made using compositions of this invention. The compositions of the present invention have excellent scratch and mar resistance and good impact strength.

A test was developed to measure surface scratch resistance. The test specimens are cut or molded to 100 mm×100 mm in dimensions, with a hole drilled in the middle for mounting. A Taber Abrasion test machine (described further in ASTM D1044) was modified by substituting a stainless steel slider with a sharp tip (radius=0.25 mm) in place of the sanding wheels to scratch the surface of the specimens. With the tip offset 34 mm from the center of rotation and the turntable spinning at 72 rpm, the actual sliding velocity is equal to 25 mm/sec, which is similar to the condition of someone scratching a surface at normal speed with a fingernail. The test is terminated after one single revolution. The normal load used for this test is 1 lb (453.6 g). Upon completion of the test, the specimens are then evaluated visually on a numerical scale of 1 to 5 where: "1" is no visible mar or scratch; "2" is a mar/scratch barely visible from a distance of 3 ft.; "3" is a mar/scratch visible from a distance of 3 ft.; "4" is a clearly visible mar/scratch with a wider scratch; and "5" is a badly gouged surface with observable fracture.

The width of the wear track and the characteristics of the failure surface can also be further studied with an optical microscope or more sophisticated instruments such as surface profilometer and scanning force microscope. The typical dimensions of the wear paths corresponding to the mar/scratch ratings are as follows:

| Mar Rating | Width of Scratch ($\mu$m) | Relative Performance |
|---|---|---|
| 1 | <50 | Excellent |
| 1.5 | 50–200 | Very good |
| 2 | 200–300 | Good |
| 3 | 300–400 | Fair |
| 4 | 400–500 | Bad |
| 5 | >500 | Poor |

A value of 1.5 or less in this test is indicative of very good or excellent performance.

TABLE 1

| | CONTROLS | | | | | | | | | |
|---|---|---|---|---|---|---|---|---|---|---|
| Polymer of | Prior art 1 | Prior art 2 | Prior art 3 | Prior art 4 | Ex. 5 | Ex. 6 | Ex. 7 | Ex. 8 | Ex. 9 | Ex. 10 |
| Polypropylene, %[1] | 70 | 100 | 70 | 60 | 65 | 60 | 55 | 60 | 60 | 60 |
| Ionomer of ethylene, % | — | — | 30 | 30 | 30 | 30 | 30 | 20 | 20 | 20 |
| Propylene-metal salts, % | — | — | — | — | 5 | 10 | 15 | 10 | 10 | 10 |
| Polypropylene-MA, %[2] | — | — | — | 10 | — | — | — | — | — | — |
| Ethylene/alpha-olefin, %[3] | 30 | — | — | — | — | — | — | 10 | — | — |
| Styrenic (block), %[4] | — | — | — | — | — | — | — | — | 10 | — |
| Styrenic (random), %[5] | — | — | — | — | — | — | — | — | — | 10 |
| Anti-oxidant Irganox B-225, % | 0.4 | 0.4 | 0.4 | 0.4 | 0.4 | 0.4 | 0.4 | 0.4 | 0.4 | 0.4 |
| Color concentrate, % | 2 | 2 | 2 | 2 | 2 | 2 | 2 | 2 | 2 | 2 |
| MFR., 230/2.16 (g/10 min) | 13.4 | 65.5 | 38.2 | 39.8 | 31.2 | 30.1 | 28.1 | 15.8 | 18 | 17.3 |
| Tensile yield strength (psi)[6] | 2800 | | 3830 | 4010 | 4080 | 3960 | 4080 | 3300 | 3900 | 3000 |
| Elongation at break (%)[6] | >1000 | 15 | 38 | 21 | 400 | 470 | 480 | 1305 | 230 | 550 |
| Flexural modules (kpsi)[7] | 124 | 273 | 179 | 186 | 204 | 192 | 203 | 148 | 164 | 107 |
| Mar on surface, 1 (best) to 5 (worst) | 5 | 1.5 | 2 | 2 | 1.5 | 1.5 | 2 | 2 | 2 | 1.5 |

[1]Polypropylene with MFR = 60 dg/min.
[2]PP-MA, polypropylene functionalized with maleic anhydride (MA), MFR = 50 dg/min.
[3]Ethylene-octene copolymer.
[4]High performance hydrogenated styrenic elastomer, SEB block copolymer.
[5]Hydrogenated styrene butadiene random copolymer.
[6]ASTM D-638.
[7]ASTM D-790.

Preferred polyolefin blends of this invention have a mar rating of 2 or less, corresponding to a 0.25 millimeter radius point under a one pound load traveling at 25 millimeters per second forming a groove with a width of about 0.3 millimeters or less. More preferred polyolefin blends of this invention have a mar rating of 1.5 or less, corresponding to a 0.25 millimeter radius point under a one pound load traveling at 25 millimeters per second forming a groove with a width of about 0.2 millimeters or less.

The prior art example 1 containing polypropylene and an ethylene-alpha-olefin copolymer has excellent toughness as shown by the elongation at break but poor tensile strength and extremely poor scratch resistance. Prior art example 2, polypropylene, has excellent scratch resistance but is brittle. Adding ionomers of ethylene to propylene as shown in example 3 results in a blend that has good scratch resistance and strength but is brittle. Adding both propylene functionalized with maleic anhydride and ethylene ionomers as shown in example 4 also still results in a brittle composition. Surprisingly, Applicants found that propylene/ethylene-based polyolefin-metal salt/propylene-based polyolefin-metal salt blends, as shown in examples 5 to 7, have excellent scratch resistance (in some cases matching the performance of polypropylene) but also have excellent toughness, as demonstrated by the elongation at break of over 200 percent. Adding a toughener such as an ethylene-alpha-olefin copolymer to a blend as shown in example 8, provides a blend that exhibits very high elongation at break, at over 1000 percent, and good scratch resistance, but has a lower tensile strength than other blends. Adding a styrenic block copolymer to a blend results in a plastic with good scratch resistance and strength.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments which would come within the spirit and scope of the present invention.

What is claimed is:

1. A polyolefin blend comprising:
    a first component of a first propylene-containing polymer;
    a second component of a propylene-based polyolefin-metal salt that is a reaction product of a second propylene-containing polymer and a first organic monomer containing a hydrophilic moiety that is at least partially neutralized with a metal ion, and/or a copolymer of propylene and a first organic monomer containing a hydrophilic moiety that is at least partially neutralized with a metal ion; and
    a third component of an ethylene-based polyolefin-metal salt that is a reaction product of a ethylene-containing polymer and a second organic monomer containing a hydrophilic moiety that is at least partially neutralized with a metal ion, and/or an ionomer that is at least partially neutralized with a metal ion.

2. The polyolefin blend of claim 1 wherein the second component is a propylene-based polyolefin-metal salt, and the third component is an ethylene-based polyolefin-metal salt.

3. The polyolefin blend of claim 1 wherein the second component is a propylene-based polyolefin-metal salt, and the third component is an ionomer.

4. The polyolefin blend of claim 1 wherein the first component comprises at least one of a homopolymer of propylene or a copolymer of propylene and ethylene, and the polyolefin blend comprises from about 50 to about 75 weight percent of the first component, from about 1 to about 30 percent of the second component, and from about 5 to about 49 percent of the third component.

5. The polyolefin blend of claim 2 wherein the first component comprises at least one of a homopolymer of propylene or a copolymer of propylene and ethylene, and the polyolefin blend comprises from about 50 to about 75 weight percent of the first component, from about 1 to about 30 percent of the second component, and from about 5 to about 49 percent of the third component.

6. The polyolefin blend of claim 1 wherein the polyolefin blend comprises from about 53 to about 70 weight percent of the first component, from about 2 to about 20 percent of the second component, and from about 15 to about 35 percent of the third component.

7. The polyolefin blend of claim 1 wherein the polyolefin blend comprises from about 57 to about 68 weight percent of the first component, from about 5 to about 15 percent of the second component, and from about 20 percent to about 30 percent of the third component.

8. The polyolefin blend of claim 1 wherein the first component is a semi-crystalline homopolymer of polypropylene, and the first and second organic monomers each comprise an ethylenically unsaturated carboxylic acid monomer.

9. The polyolefin blend of claim 8 wherein the first and second organic monomers each comprise methacrylic acid, acrylic acid, maleic anhydride, or a mixture thereof.

10. The polyolefin blend of claim 1 further comprising about 1 percent to about 20 weight percent of a toughening component comprising a reaction product of a copolymer of ethylene and at least one alpha-olefin with a third organic monomer containing a hydrophilic moiety.

11. The polyolefin blend of claim 10 wherein the alpha-olefin is selected from the group consisting of 1-butene, 1-hexene, 4-methyl-1-pentene, 1-heptene, 1-octene, and mixtures thereof, and said third reaction product is at least partially neutralized with a metal ion.

12. The polyolefin blend of claim 1 further comprising an interfacial modifier of a random terpolymer, a thermoplastic elastomer, or a mixture thereof.

13. The polyolefin blend of claim 12 wherein the thermoplastic elastomer comprises a styrenic block copolymer, a random styrenic copolymer, or mixtures thereof, present in an amount of about 1 to about 20 weight percent.

14. The polyolefin blend of claim 12 wherein the random terpolymer comprises ethylene, an alpha-olefin and a diene, and is present in an amount of about 1 to about 25 percent.

15. The polyolefin blend of claim 1 further comprising a random copolymer of ethylene and styrene, wherein the random copolymer of styrene and ethylene has a blocky comonomer distribution.

16. The polyolefin blend of claim 1 further comprising a mineral filler in an amount from about 1 to about 40 weight percent.

17. The polyolefin blend of claim 16 wherein the mineral filler is selected from the group consisting of talc, calcium carbonate, wollastonite, alumina trihydrate, barium sulfate, calcium sulfate, carbon blacks, metal fibers, boron fibers, ceramic fibers, polymeric fibers, kaolin, glass, ceramic, carbon or polymeric microspheres, silica, mica, glass fiber, carbon fiber, clay, or mixtures thereof in an amount from about 1 weight percent to about 25 weight percent.

18. The polyolefin blend of claim 1 wherein the metal ion is selected from the group consisting of lithium, sodium, potassium, magnesium, calcium, barium, lead, tin, zinc, aluminum, and mixtures thereof.

19. The polyolefin blend of claim 2 wherein the metal ion is selected from the group consisting of zinc, lithium, sodium, calcium, magnesium, and mixtures thereof.

20. An article comprising the polyolefin blend of claim 1.

21. The article of claim 20 wherein a 0.25 millimeter radius point under a one pound load traveling at about 25 millimeters per second forms a groove the surface of the article where the width of the groove is about 0.3 millimeters or less.

22. A method of preparing an article from a polyolefin blend which comprises:
    providing a first component of a first propylene-containing polymer
    adding second component of a propylene-based polyolefin-metal salt that is a reaction product of a second propylene-containing polymer and a first organic monomer containing a hydrophilic moiety, wherein said second component is at least partially neutralized with a metal ion, and
    adding a third component of an ethylene-based polyolefin-metal salt that is a reaction product of an ethylene-containing polymer and a second organic monomer containing a hydrophilic moiety, wherein said third component is at least partially neutralized with a metal ion;
    mixing the first component, the second component, and the third component to form a blend; and
    molding the blend into an article having an external surface, wherein the surface of the article when subjected to a 0.25 millimeter radius point under a one pound load traveling at about 25 millimeters per second scratches a groove with a width of about 0.3 millimeters or less.

23. The method of claim 22 wherein the second reaction product is an ethylene-containing polyolefin metal salt which is prepared by reacting the ethylene-containing polyolefin and the organic monomer containing a hydrophilic moiety under conditions such that the ethylene-containing polyolefin is functionalized with the hydrophilic moiety to form the reaction product, and neutralizing the reaction product with a metal ion.

24. The method of claim 22 wherein the second reaction products are formed in a single reaction mass.

25. The method of claim 24 wherein the reaction products are neutralized with metal ions while simultaneously blending the components in a twin screw extruder.

* * * * *